C. G. Bloomer,
Making Lockets,
No. 850. Reissued Nov. 15, 1859.
Fig. A
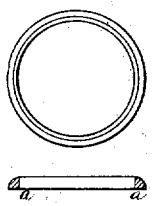
Fig. B
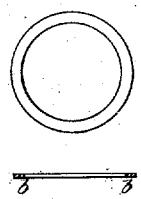
Fig. C
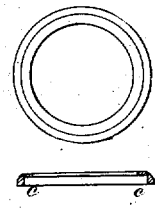
Fig. 1.
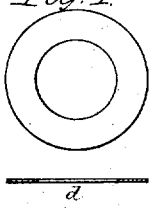
Fig. 2.
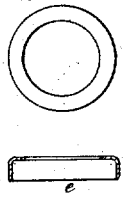
Fig. 3.
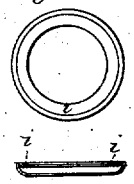
Fig. 4.
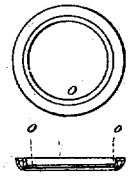
Fig. 5.
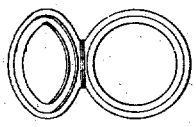
Fig. 6
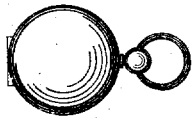
Fig. 7.
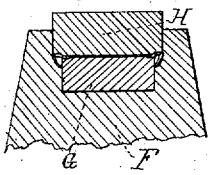
Fig. 8.
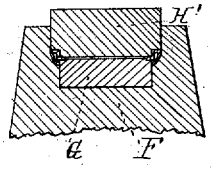
Witnesses:
James Elliott
William H. Congdon,
Inventor:
Charles G. Bloomer
M. PETERS, PHOTO-LITHOGRAPHER, WASHINGTON, D. C.

UNITED STATES PATENT OFFICE.

CHARLES G. BLOOMER, OF WICKFORD, RHODE ISLAND.

RIM FOR LOCKETS.

Specification forming part of Letters Patent No. 17,137, dated April 28, 1857; Reissue No. 850, dated November 15, 1859.

*To all whom it may concern:*

Be it known that I, CHARLES G. BLOOMER, of Wickford, in the county of Washington and State of Rhode Island, have invented a new and useful Improvement in Lockets and Similar Metallic Cases; and I do hereby declare that the following is a full, clear, and exact description of the same, reference being had to the accompanying drawings, and to the letters of reference marked thereon.

Lockets are formed of two halves or sides alike in general form, connected by a hinge held shut by a spring-catch and suspended by a metallic ring passed through a stud or knob so as to resemble in material form and finish an ordinary watch-case. Each side of the locket consists, generally, of two parts, a ring-base, commonly called the "rim," and the plate that forms the outer case or "back." The latter is frequently replaced on one side of the locket by a glass similar to a watch-glass.

Prior to my invention the rim of each side of the locket was generally formed of two pieces, of the form represented at Figures A, B, and C. One of the pieces consisted of a solid ring, Fig. A, formed of wire of the section required, as shown at *a a*, bent into a ring form and soldered where the ends met. The other piece, Fig. B, which is commonly called the "field-piece," was formed of flat wire, as shown in section at *b b*, also bent into a ring form, and soldered where the ends met. The two pieces were then soldered together, as represented at Fig. C. Locket-rims constructed in this manner are objectionable on account of the cost of manufacture and the weight of metal required.

The invention which is the subject of this patent is designed to supersede locket-rims formed by the above method; and it consists in a rim for a locket or similar metallic case formed of sheet metal in such manner that the ring and "field-piece" consist of one piece of thin sheet metal so bent that the face of the field-piece within the locket and the exterior surface of the ring are formed by the same surface of the original sheet metal.

My case-rim may be manufactured in various ways, but I prefer to manufacture it by stamping a planchet out of sheet metal and changing its form wholly by the action of suitable dies. In manufacturing by this mode of operation a planchet, such as is represented at Fig. 1 is stamped out of the sheet metal by a suitable punching-tool. It is then subjected to the action of a set of dies, which give it the shape represented at Fig. 2. It is then subjected to a second set of dies—such, for example, as those represented in section at Fig. 7—which give it the form represented at Fig. 3, the action of the dies being such that the cylindrical part of Fig. 2 is turned inward to form the flat ring *i* of Fig. 3, which is now of the proper form for one side of the locket or case. The metal to form the rim for the other side of the locket is subjected to a third set of dies—such, for example, as those represented in section at Fig. 8—after it has been acted upon by the first two first sets above mentioned. This third set carry the bending process still further, indent the flat field-piece *i* of Fig. 3 and give it the proper shape to constitute the depressed field-piece, as shown at *o*, Fig. 4. After the rims are completed, the solid backs are fitted to them, two rims are connected by a hinge, the stud or knob and the ring are applied, so that the whole constitutes a case such as is represented open at Fig. 5 and closed at Fig. 6.

I have not deemed it necessary in the foregoing description to describe in detail the construction of the dies and the mechanism by which they are operated, as these constitute no part of the invention which is the subject-matter of this patent. Moreover, my invention is not limited to the mode of forming the sheet metal into the shape required wholly by the action of dies, although I prefer this method to others both on account of the little manual labor required and the economy of the material. The latter becomes obvious when it is considered that the planchet punched out of Fig. 1 is of proper size and shape to form a locket-rim of smaller size, and the planchet punched from the latter forms the half of a locket-stud or knob. So, also, the pieces of sheet metal which are left after punching out the series of planchets first cut from the sheet are worked up into rims or knobs until the only scraps remaining are triangular pieces of too small size to form parts for the smallest-sized lockets. My invention is particularly adapted to cases of plated metal, for, as the face of the field-piece and the exterior of the rim are both formed of the same surface of the sheet metal the latter requires to be plated on one side only. Case-rims made in this manner are also advantageous on account of their light weight.

I do not limit myself to any peculiarity in the method of manufacturing my case-rims, but

What I claim as my invention, and desire to secure by Letters Patent, is—

A rim for lockets and similar metallic cases, formed of sheet metal in such manner that the face of the field-piece within the case and the exterior surface of the rim are both formed from the same side or surface of the original sheet metal, and that the field-piece and rim are of one piece of metal.

In testimony whereof I have hereunto subscribed my name.

CHARLES G. BLOOMER.

Witnesses:

WILLIAM H. CONGDON,

JAMES ELDVELL.